United States Patent
Hopper et al.

(10) Patent No.: US 8,966,325 B2
(45) Date of Patent: Feb. 24, 2015

(54) IDENTIFYING UNRELIABLE PARTS IN AN IT INFRASTRUCTURE

(75) Inventors: Robin L. K. Hopper, Prague (CZ); Philippe Dubost, Prague (CZ)

(73) Assignee: CA, Inc., Islandia, NY (US)

( * ) Notice: Subject to any disclaimer, the term of this patent is extended or adjusted under 35 U.S.C. 154(b) by 217 days.

(21) Appl. No.: 13/605,619

(22) Filed: Sep. 6, 2012

(65) Prior Publication Data

US 2014/0068329 A1 Mar. 6, 2014

(51) Int. Cl.
G06F 11/00 (2006.01)

(52) U.S. Cl.
USPC .............................. 714/47.1; 714/4.3; 714/25

(58) Field of Classification Search
USPC ............................................ 714/4.3, 25, 47.1
See application file for complete search history.

(56) References Cited

U.S. PATENT DOCUMENTS

| | | |
|---|---|---|
| 6,704,874 B1 | 3/2004 | Porras et al. |
| 7,139,938 B2 | 11/2006 | Marwaha |
| 7,694,115 B1 | 4/2010 | Porras et al. |
| 7,756,828 B2 | 7/2010 | Baron et al. |
| 7,911,334 B2 | 3/2011 | Busey |
| 8,015,137 B2 | 9/2011 | Allen et al. |
| 8,024,367 B2 | 9/2011 | Heinzel et al. |
| 8,161,326 B2 | 4/2012 | Dixit et al. |
| 8,200,620 B2 | 6/2012 | Akiyama et al. |
| 2009/0240510 A1 | 9/2009 | Hopkins et al. |
| 2012/0283988 A1* | 11/2012 | Pandey et al. .................. 702/179 |

* cited by examiner

Primary Examiner — Joshua P Lottich
(74) Attorney, Agent, or Firm — Baker Botts L.L.P.

(57) ABSTRACT

A method receiving a first alert indicating a fault associated with a first node of a plurality of nodes. The method further includes determining a first value indicating a measure of reliability for the first node based on an amount of first node downtime associated with the first alert and a severity of the first alert.

20 Claims, 2 Drawing Sheets

IDENTIFYING UNRELIABLE PARTS IN AN IT INFRASTRUCTURE

BACKGROUND

Parts of an Information Technology (IT) infrastructure, such as servers or network elements, may periodically cause errors or may fail. In existing systems, IT support personnel may use a certain fault finding process to discover a root cause of the issue. This fault finding process may involve, for example, looking at successive nodes in a network until the faulty node is found. However, in many instances, this may be an inefficient and/or time consuming method for finding the root cause of an issue.

BRIEF SUMMARY

According to one embodiment of the present disclosure, a method receiving a first alert indicating a fault associated with a first node of a plurality of nodes. The method further includes determining a first value indicating a measure of reliability for the first node based on an amount of first node downtime associated with the first alert and a severity of the first alert. In certain embodiments, determining the first value may be based on a severity score and a downtime score, wherein the severity score is based on the severity of the alert and the downtime score is based on the amount of first node downtime associated with the first alert.

According to particular embodiments of the present disclosure, the method may further include receiving a second alert indicating a fault associated with the first node. In such embodiments, determining the first value may be based upon the amount of first node downtime associated with the first alert, the severity of the first alert, an amount of first node downtime associated with the second alert, and the severity of the second alert.

According to certain embodiments of the present disclosure, the method may further include receiving a third alert indicating a fault associated with a second node of the plurality of nodes. The method may also include determining a second value indicating a measure of reliability for the second node based on an amount of second node downtime associated with the third alert and a severity of the third alert. A ranking of the first and second nodes based on the first and second values may then be determined.

In some embodiments, each alert may include a name indicating a person involved with supporting the node associated with the alert, and the method may further include determining, for each node, a ranking of the names based on a number of alerts including each name.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
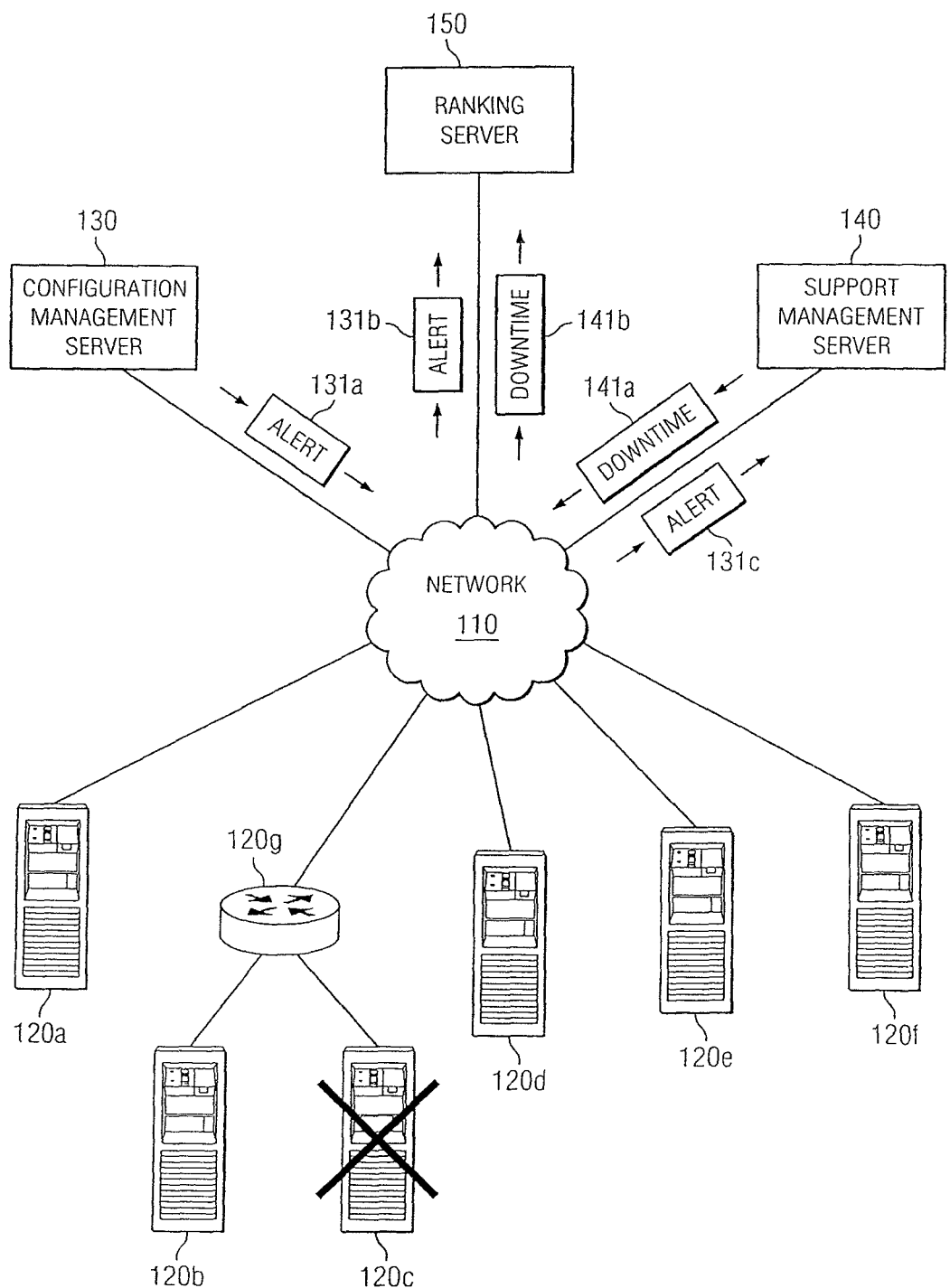
FIG. 1 illustrates a system that includes a network connecting a plurality of nodes, a configuration management server, a support management server, and a ranking server in accordance with particular embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a system 100 in accordance with certain embodiments of the present disclosure includes a network 110 that may connect a plurality of nodes 120, a configuration management server 130, a support management server 140, and a ranking server 150. Certain embodiments of the present disclosure may allow for the monitoring of hardware faults (e.g., disk failure, disk full, processor failure, memory issues, power failure, unavailability, packet loss, etc.) and/or software failures (e.g., operating system, database, webserver code, batch programs, file transfer programs, online transaction processing programs, etc.) associated with nodes 120 on network 110, and may allow for more efficient determinations of the cause of those faults. Nodes 120 may refer to any component of an IT infrastructure (e.g. servers, desktops, routers, switches, etc.) and may be separately or collectively associated with a service or services provided in the IT infrastructure. In current infrastructures, faults associated with nodes 120 may lead to a logical fault finding process that may be inefficient. For instance, support personnel may need to look at every node 120 in a certain order to determine which node is causing a fault. In the case where node 120c has a fault, this may mean that support personnel would need to look at nodes 120a, 120b, 120f, and/or others before realizing that 120c was where the fault originated. However, if node 120c is known to cause repeated faults, it may be more efficient for support personnel to look to node 120c first in any fault finding process. Having knowledge of those nodes in an IT infrastructure which tend to be more unreliable may therefore be advantageous.

Accordingly, in particular embodiments, configuration management server 130 may monitor nodes 120 on network 110 for faults and track which nodes tend to be unreliable. For example, in the event of a fault of node 120c, configuration management server 130 may generate alerts 131 that are sent to support management server 140 and/or ranking server 150. These alerts may be associated with node 120c and may also include the name of the support personnel assigned to determining and/or servicing the fault. In addition, the alert may indicate a severity of the fault, such as with a numerical indication (i.e., 1-5). Once node 120c is fixed by support personnel or the fault is otherwise rectified, support management server 140 may send a downtime indication 141 associated with the fault to ranking server 150, which may include the amount of time that node 120c was down due to the fault. With this information, ranking server 150 may then rank each of the nodes 120 based on their reliability. For instance, based on the severity of alerts received and the amount of downtime associated with the alerts, ranking server 150 may calculate corresponding severity scores and downtime scores for each node 120. These scores may be determined in any suitable way. For example, alert severities and amounts of downtime may each be multiplied by some respective factor to yield severity and downtime scores. The factor may be determined by an administrator of the IT infrastructure, which may allow for scaling of each respective fault measure (i.e., severity is more important than downtime, and vice versa). From these scores, ranking server 150 may then determine an overall reliability value for each node 120 indicating the reliability of the nodes 120. Based on the reliability values determined, ranking server 150 may then rank nodes 120 in order to determine which nodes are the most troublesome. In addition, ranking server 150 may, for each node 120, rank support personnel based on the amount of experience each has had with the node. This may be based, for example, on the amount of alerts each person has serviced for the node. Although configuration management server 130, support management server 140, and ranking server 150 are depicted as separate servers in FIG. 1, the functionality performed by each server may be performed on any number of servers.

Network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof.

Nodes 120, configuration management server 130, support management server 140, and ranking server 150 may be any suitable apparatus for transmitting or receiving audio, video, signals, data, messages, or any combination of the preceding over network 110. For example, nodes 120 may include computing devices such as servers or desktops, and may also include network components such as routers, switches, and the like. Nodes 120, configuration management server 130, support management server 140, and ranking server 150 may each include one or more computers as described further below with regard to FIG. 2.

Figure 2:
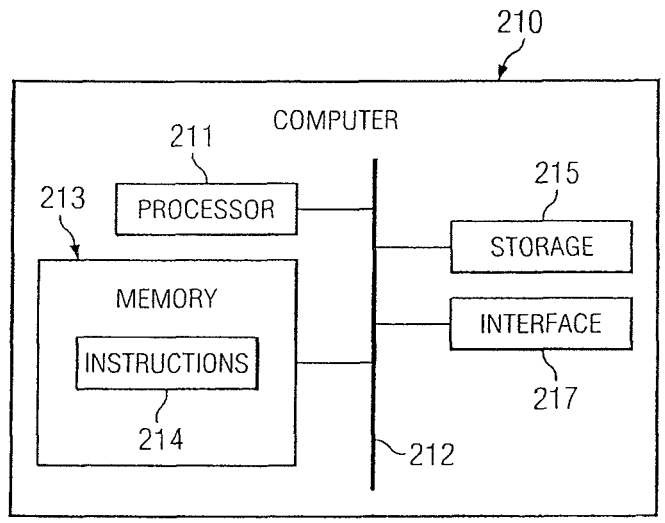
FIG. 2 illustrates a block diagram of a computer that may be used in accordance with particular embodiments of the present disclosure.

FIG. 2 illustrates a block diagram of a computer 210 that may be used in accordance with particular embodiments. For instance, in particular embodiments, one or more computers 210 may be included in configuration management server 130, support management server 140, or ranking server 150 of FIG. 1. Each computer 210 may include its own respective processor 211, memory 213, instructions 214, storage 215, interface 217, and bus 212. These components may work together to perform one or more steps of one or more methods and provide the functionality described herein. For example, in particular embodiments, instructions 214 in memory 213 may be executed on processor 211 in order to perform one or more methods (e.g. the method of FIG. 3) using alerts received by interface 217. In certain embodiments, instructions 214 may reside in storage 215 instead of, or in addition to, memory 213.

Processor 211 may be a microprocessor, controller, application specific integrated circuit (ASIC), or any other suitable computing device operable to provide, either alone or in conjunction with other components (e.g., memory 213 and instructions 214) IT infrastructure monitoring functionality. Such functionality may include providing a ranking of the most troublesome or unreliable components of an IT infrastructure, as discussed herein. In particular embodiments, processor 211 may include hardware for executing instructions 214, such as those making up a computer program or application. As an example and not by way of limitation, to execute instructions 214, processor 211 may retrieve (or fetch) instructions 214 from an internal register, an internal cache, memory 213 or storage 215; decode and execute them; and then write one or more results to an internal register, an internal cache, memory 213, or storage 215.

Memory 213 may be any form of volatile or non-volatile memory including, without limitation, magnetic media, optical media, random access memory (RAM), read-only memory (ROM), flash memory, removable media, or any other suitable local or remote memory component or components. Memory 213 may store any suitable data or information utilized by computer 210, including software (e.g., instructions 214) embedded in a computer readable medium, and/or encoded logic incorporated in hardware or otherwise stored (e.g., firmware). In particular embodiments, memory 213 may include main memory for storing instructions 214 for processor 211 to execute or data for processor 211 to operate on. In particular embodiments, one or more memory management units (MMUs) may reside between processor 211 and memory 213 and facilitate accesses to memory 213 requested by processor 211.

Storage 215 may include mass storage for data or instructions (e.g., instructions 214). As an example and not by way of limitation, storage 215 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 215 may include removable or non-removable (or fixed) media, where appropriate. Storage 215 may be internal or external to computer 210 (and/or remote transceiver 220), where appropriate. In some embodiments, instructions 214 may be encoded in storage 215 in addition to, in lieu of, memory 213.

Interface 217 may include hardware, encoded software, or both providing one or more interfaces for communication (such as, for example, packet-based communication) between computer 210 and any other computer systems on network 110. As an example, and not by way of limitation, interface 217 may include a network interface controller (NIC) or network adapter for communicating with an Ethernet or other wire-based network and/or a wireless NIC (WNIC) or wireless adapter for communicating with a wireless network. Interface 217 may include one or more connectors for communicating traffic (e.g., IP packets) via a bridge card. Depending on the embodiment, interface 217 may be any type of interface suitable for any type of network in which computer 210 is used. In some embodiments, interface 217 may include one or more interfaces for one or more I/O devices. One or more of these I/O devices may enable communication between a person and computer 210. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 212 may include any combination of hardware, software embedded in a computer readable medium, and/or encoded logic incorporated in hardware or otherwise stored (e.g., firmware) to couple components of computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses.

Figure 3:
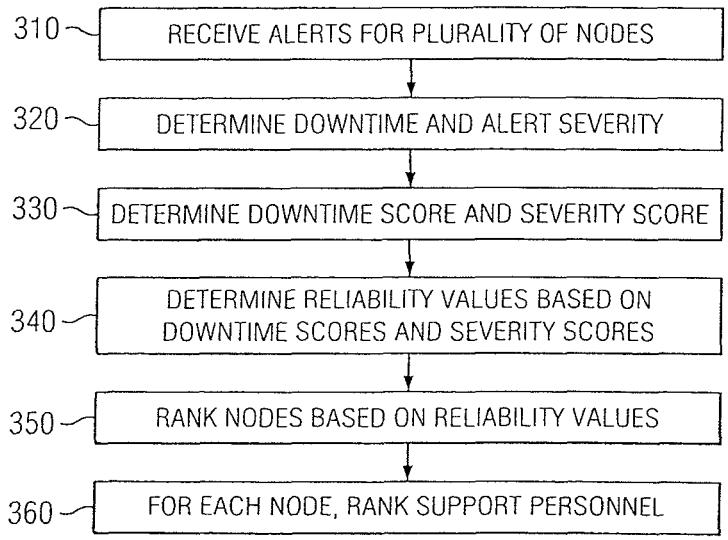
FIG. 3 illustrates an example method for identifying the most unreliable parts of an IT infrastructure in accordance with particular embodiments of the present disclosure.

FIG. 3 illustrates an example method for identifying the most unreliable parts of an IT infrastructure in accordance with particular embodiments of the present disclosure. The method may be performed, in particular embodiments, by ranking server 150 on network 110, and may be performed by executing instructions (e.g., instructions 214) encoded in a computer readable medium (e.g. memory 213, storage 215) on a processor (e.g. processor 211) within ranking server 150.

The method begins at step 310, where alerts for a plurality of nodes are received. The alerts may be generated by any suitable monitoring component of an IT infrastructure, such as configuration management server 130 of FIG. 1. The alerts may be associated with a node and may include a support personnel member assigned with rectifying the fault at a node. The alert may then be sent to a separate monitoring component for further analysis. At step 320, the severity and downtime associated with each of the alerts is determined. In particular embodiments, the alert severity and downtime associated with the alert may be determined by different components, such as by configuration management server 130 and support management server 140, respectively. For instance, configuration management server 130 may send an alert including a severity indicator for the fault associated with the alert, such as a numerical indication of the severity level (e.g., 1-5). Similarly, support management server 140 may send a downtime indication including the amount of downtime associated with a particular alert. In other embodiments, the alert severity and downtime associated with the alert may be determined by the same monitoring component. This information may then be sent to another monitoring component, such as ranking server 150, for further analysis.

At step 330, severity and downtime scores are determined. The severity and downtime scores may be determined by simple algorithms and may be set by an administrator of an IT infrastructure. As an example, the severity indicator and amount of downtime may be multiplied a particular factors that take into account the respective weights that each should be given when determining a reliability value. For instance, a severity level of 3 may be multiplied by 20 to yield a severity score of 60. Similarly, the amount of downtime may be 3 minutes and may be multiplied by a factor of 50 to yield a downtime score of 150. These scores may then be used at step 340 in determining reliability values for each node being monitored. The reliability score may be determined by any suitable algorithm, including addition of the severity and downtime scores determined in step 330. In the case of multiple alerts for a device, the severity and downtime scores from each of the alerts may all be added to yield a reliability score for a node. Once reliability scores are determined for each of the nodes at step 340, the nodes are ranked according to their reliability values at step 350. This ranking may be helpful, for instance, in determining which node to look to first in the event of future faults. Finally, at step 360, support personnel who have been associated with the alerts are ranked for each device. This may allow administrators to see which support personnel are most familiar with a particular node, and may be used to determine who the best person to dispatch would be in the event of a fault associated with that device.

The flowchart and block diagrams in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed:

1. A method, comprising:
   receiving a first alert indicating a fault associated with a first node of a plurality of nodes; and
   determining a first value indicating a measure of reliability for the first node based on an amount of first node downtime associated with the first alert and a severity of the first alert.

2. The method of claim 1, wherein determining a first value based on the amount of first node downtime and the severity of the first alert comprises:
   determining a severity score based on the severity of the alert;
   determining a downtime score based on the amount of first node downtime associated with the first alert;
   determining the first value based on the severity score and the downtime score; and wherein the severity score comprises a numerical indication.

3. The method of claim 1, further comprising:
   receiving a second alert indicating a fault associated with the first node;
   wherein determining the first value is based upon the amount of first node downtime associated with the first alert, the severity of the first alert, an amount of first node downtime associated with the second alert, and the severity of the second alert.

4. The method of claim 1, further comprising:
   receiving a third alert indicating a fault associated with a second node of the plurality of nodes; and
   determining a second value indicating a measure of reliability for the second node based on an amount of second node downtime associated with the third alert and a severity of the third alert.

5. The method of claim 4, further comprising determining a ranking of the first and second nodes based on the first and second values.

6. The method of claim 4, wherein each alert includes a name indicating a person involved with supporting a corresponding node associated with that alert.

7. The method of claim 6, further comprising determining, for each node, a ranking of names based on a number of alerts including each name.

8. A system, comprising:
   a memory;
   an interface configured to:
   receive a first alert indicating a fault associated with a first node of a plurality of nodes; and
   a hardware processor configured to:
      determine a first value indicating a measure of reliability for the first node based on an amount of first node downtime associated with the first alert and a severity of the first alert.

9. The system of claim 8, wherein the hardware processor configured to determine a first value based on the amount of first node downtime and the severity of the first alert is configured to:
   determine a severity score based on the severity of the alert;
   determine a downtime score based on the amount of first node downtime associated with the first alert; and
   determine the first value based on the severity score and the downtime score.

10. The system of claim 8, wherein the interface is further configured to receive a second alert indicating a fault associated with the first node, and wherein the hardware processor is configured to determine the first value based upon the amount of first node downtime associated with the first alert, the severity of the first alert, an amount of first node downtime associated with the second alert, and the severity of the second alert.

11. The system of claim 8, wherein the interface is further configured to receive a third alert indicating a fault associated with a second node of the plurality of nodes, and wherein the hardware processor is further configured to determine a second value indicating a measure of reliability for the second node based on an amount of second node downtime associated with the third alert and a severity of the third alert.

12. The system of claim 11, wherein the hardware processor is further configured to determine a ranking of the first and second nodes based on the first and second values.

13. The system of claim 11, wherein each alert includes a name indicating a person involved with supporting a corresponding node associated with that alert.

14. The system of claim 13, wherein the hardware processor is further configured to determine, for each node, a ranking of names based on a number of alerts including each name.

15. A computer program product comprising:
a non-transitory computer readable storage medium having computer readable program code embodied therewith, the computer readable program code comprising:
computer readable program code configured to receive a first alert indicating a fault associated with a first node of a plurality of nodes; and
computer readable program code configured to determine a first value indicating a measure of reliability for the first node based on an amount of first node downtime associated with the first alert and a severity of the first alert.

16. The computer program product of claim 15, wherein the computer readable program code configured to determine a first value based on the amount of first node downtime and the severity of the first alert is configured to:
determine a severity score based on the severity of the alert;
determine a downtime score based on the amount of first node downtime associated with the first alert; and
determine the first value based on the severity score and the downtime score.

17. The computer program product of claim 15, further comprising:
computer readable program code configured to receive a second alert indicating a fault associated with the first node;
wherein the computer readable program code is configured to determine the first value based upon the amount of first node downtime associated with the first alert, the severity of the first alert, an amount of first node downtime associated with the second alert, and the severity of the second alert.

18. The computer program product of claim 15, further comprising:
computer readable program code configured to receive a third alert indicating a fault associated with a second node of the plurality of nodes; and
computer readable program code configured to determine a second value indicating a measure of reliability for the second node based on an amount of second node downtime associated with the third alert and a severity of the third alert.

19. The computer program product of claim 18, further comprising computer readable program code configured to determine a ranking of the first and second nodes based on the first and second values.

20. The computer program product of claim 18, wherein each alert includes a name indicating a person involved with supporting a corresponding node associated with that alert, and wherein the computer program product is further configured to determine, for each node, a ranking of names based on a number of alerts including each name.

* * * * *